(12) United States Patent
Jung et al.

(10) Patent No.: US 7,272,316 B2
(45) Date of Patent: Sep. 18, 2007

(54) WAVELENGTH-DIVISION-MULTIPLEXED OPTICAL SOURCE AND PASSIVE OPTICAL NETWORK SYSTEM EMPLOYING THE SAME

(75) Inventors: Dae-Kwang Jung, Suwon-shi (KR); Byung-Chang Kang, Yongin-shi (KR); Tae-Sung Park, Suwon-shi (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 745 days.

(21) Appl. No.: 10/642,778

(22) Filed: Aug. 18, 2003

(65) Prior Publication Data

US 2004/0136716 A1    Jul. 15, 2004

(30) Foreign Application Priority Data

Jan. 15, 2003    (KR) .................... 10-2003-0002622

(51) Int. Cl.
*H04J 14/00* (2006.01)
*H04J 14/02* (2006.01)
*H04B 10/00* (2006.01)
*H04B 10/12* (2006.01)
*H01S 3/00* (2006.01)

(52) U.S. Cl. ...................... 398/72; 398/70; 398/71; 398/92; 398/153; 398/157; 359/341.3

(58) Field of Classification Search ............ 398/70–73, 398/91, 92, 153, 157; 359/341.3–341.33, 359/341.4
See application file for complete search history.

(56) References Cited

U.S. PATENT DOCUMENTS

| 5,742,414 | A  | * | 4/1998 | Frigo et al. .................... 398/66 |
| 6,577,422 | B1 | * | 6/2003 | Frigo et al. .................... 398/49 |
| 2002/0093710 | A1 | * | 7/2002 | Birk et al. .................... 359/125 |
| 2003/0039010 | A1 | * | 2/2003 | Akimoto et al. ............ 359/152 |

FOREIGN PATENT DOCUMENTS

| JP | 10-093164 | 4/1998 |
| JP | 2001-356226 | 12/2001 |

* cited by examiner

*Primary Examiner*—Jason Chan
*Assistant Examiner*—Nathan Curs
(74) *Attorney, Agent, or Firm*—Cha & Reiter, LLC

(57) ABSTRACT

A WDM optical source, in adopting a spectrum-sliced method, advantageously needs neither an optical source with specific generation wavelength nor a wavelength-stabilizing circuit for stabilizing wavelength. Affording high power and a very narrow line width, the WDM optical source can provide a broadcasting service without signal distortion by a chromatic dispersion effect and also avoids the expense of an amplifier and/or external modulator, thereby relieving subscribers of the economical burden. The practical use of WDM-PON and of WDM-PON using an inventive WDM optical source can therefore be brought to fruition and broadcasting service can be provided economically.

22 Claims, 10 Drawing Sheets

WAVELENGTH-DIVISION-MULTIPLEXED OPTICAL SOURCE AND PASSIVE OPTICAL NETWORK SYSTEM EMPLOYING THE SAME

CLAIM OF PRIORITY

This application claims priority from an application entitled "Wavelength-Division-Multiplexed Optical Source and Passive Optical Network System Employing the Same," filed in the Korean Intellectual Property Office on Jan. 15, 2003 and assigned Serial No. 2003-2622, the contents of which are hereby incorporated by reference.

BACKGROUND OF THE INVENTION

1. Field of the Invention

The present invention relates to a wavelength-division-multiplexed optical source and a passive optical network system employing the same, and more particularly, to a wavelength-division-multiplexed optical source for providing data services and broadcasting services, and to a passive optical network system employing the same.

2. Description of the Related Art

A Wavelength-Division-Multiplexed Passive Optical Network (WDM-PON) provides broadband communication services at very high speed by using intrinsic wavelengths assigned to each subscriber. Therefore, the WDM-PON can keep a communication secret with certainty and can easily accommodate an increase in communication capacity as well as a special communication service requested by a subscriber. In particular, the WDM-PON can be reconfigured for new subscriber terminals just by adding intrinsic wavelengths to be assigned to each additional terminal. Advantageously, the WDM-PON can thus easily be made to accommodate extra subscriber terminals.

However, a central office (CO) and subscriber terminals of which the WDM-PON is comprised must have at least one optical source with an assigned oscillation wavelength and at least one wavelength-stabilizing circuit for stabilizing the wavelength of the optical source, which imposes a high cost burden on the subscribers to the WDM-PON. The WDM-PON has not yet been put to practical use for this reason in spite of its many advantages. There accordingly exists a need for an economical optical source in order to put the WDM-PON to practical use.

Implementation of a broadcasting service through a WDM-PON, instead of through another hybrid coaxial network (HFC network) as is currently conventional, would also advantageously reduce cost. Therefore, a number of studies for utilizing a WDM-PON for a broadcasting service are vigorously being pursued, and a variety of methods for providing a broadcasting service have been proposed. Examples of methods for providing a broadcasting service include through a distributed feedback laser (DFB laser), through a distributed feedback laser array (DFB laser array), and through a spectrum-sliced light source. The characteristics of each method are as follows.

The broadcasting service provision method using a DFB laser directly modulates a distributed feedback laser in accordance with broadcasting service signals, amplifies the modulated signals through an optical amplifier, and outputs the amplified signals through a power splitting optical link to provide the broadcasting service to each subscriber terminal. The power splitting optical link is provided with a special link so as to be differentiated from the optical link of WDM for data service.

This method complicates the manufacturing procedure and requires the use of high-priced elements which are necessary to provide accurate wavelength selectivity and wavelength stability of a WDM optical source. The method further requires a special power splitting optical link so as to be differentiated from the optical link of WDM for data service. Subscribers are therefore burdened by additional construction cost and continuous investment from the viewpoint of maintenance and operation.

The broadcasting service provision method using a DFB laser array, carrying some of the same disadvantages as the broadcasting service provision using a DFB laser, electrically multiplexes data service signals and broadcasting service signals of differing frequency bands, modulates directly each distributed feedback laser in accordance with the multiplexed signals, and then outputs the signals through optical link of WDM to provide the broadcasting service to each subscriber terminal. Similar to the case of the broadcasting service provision method using a DFB laser, this method complicates manufacturing and requires the use of high-priced elements which are needed to provide accurate wavelength selectivity and wavelength stability of the WDM optical source. Also characteristic of this method is degradation of data service signals and broadcasting service signals due to their simultaneous provision through one channel.

The broadcasting service provision method using a spectrum-sliced light source modulates directly or indirectly an optical source outputting optical signals of wide bandwidth in accordance with broadcasting service signals, spectrally slices the modulated signals, and outputs plenty of wavelength-sliced channels generated as the result through optical link of the WDM to provide the broadcasting service to each subscriber terminal. This method therefore doesn't need an optical source with specific generation wavelength and a wavelength-stabilizing circuit for stabilizing the wavelength. Examples of an optical source for the spectrum-sliced method are a light emitting diode (LED), a super luminescent diode (SLD) and a fiber amplifier light source.

Disadvantageously, transmission performance may be degraded for the broadcasting service provision method using a spectrum-sliced light source, because this method causes some distortion of the broadcasting service signals by chromatic dispersion effect. The receive sensitivity may also be degraded, because signal-to-signal beat noise generated in an optical receiver exists in the bandwidth of the broadcasting service signals. Although the LED and the SLD have extremely wide optical bandwidth and may cut the construction cost, narrow modulation bandwidth causes the transmissible capacity of the broadcasting service signals to be small, and the low output of optical sources require the addition of an optical amplifier for compensating the loss generated by the spectrum slicing. Another optical source and yet another optical amplifier must be additionally included so as to provide more capacity for broadcasting service signals. Also, although the fiber amplifier light source may provide high power for spectrum-sliced channels, use of the light source entails the high price of an external modulator.

SUMMARY OF THE INVENTION

The present invention has been made to solve the above-mentioned problems and provides an economical wavelength-division-multiplexed (WDM) optical source for putting a wavelength-division-multiplexed passive optical network (WDM-PON) to practical use.

In another aspect, the present invention provides an economical WDM optical source for economically providing broadcasting services in the WDM-PON.

In a further aspect, the present invention provides a central office system of the WDM-PON for providing economical broadcasting services.

As an alternative aspect, the present invention provides a local office system of the WDM-PON for providing economical broadcasting services.

In yet another aspect, the present invention provides subscriber terminals of the WDM-PON to afford economical broadcasting services.

An inventive wavelength-division-multiplexed optical source comprises: a pump laser; a first optical amplifier, operated by rear-pumping of the pump laser, for generating amplified spontaneous emission noise (ASE noise); a first multiplexer/demultiplexer having a first input/output terminal on one side and a plurality of second input/output terminals on the other side, for demultiplexing signals inputted into the first input/output terminal and outputting the demultiplexed signals to the second input/output terminals, and for multiplexing signals inputted into the second input/output terminals and outputting the multiplexed signals to the first input/output terminal; a plurality of mirrors, connected to the second input/output terminals in one-to-one correspondence, for inputting again the demultiplexed signals outputted through the second input/output terminals; a circulator for transmitting signals inputted from the first optical amplifier to the first input/output terminal, and for outputting multiplexed signals inputted from the first input/output terminal; a second optical amplifier, operated by rear-pumping of the pump laser, for amplifying multiplexed signals outputted from the circulator; an optical splitter for splitting the multiplexed signals amplified by the second optical amplifier and for outputting split signals to the first optical amplifier and for external transmission, respectively; and an external modulator for modulating the signals outputted for external transmission according to preset broadcasting signals and for outputting the modulated signals to a transmission link.

In accordance with another aspect of the present invention, there is provided a passive optical network system including a central office, a local office, and a plurality of subscriber terminals, the central office being connected with the local office through an optical fiber and providing optical communication service to the subscriber terminals through the local office, the central office comprising: a first wavelength-division-multiplexed (WDM) optical source for providing a downstream broadcasting service to the subscriber terminals; a second WDM optical source for providing a downstream data service to the subscriber terminals; a plurality of optical receivers for receiving upstream data service signals transmitted from each subscriber terminal and converting the received signals to electric signals; a plurality of first wavelength division multiplexers for multiplexing/demultiplexing upstream/downstream data service signals to provide upstream/downstream data services to the subscriber terminals; a second multiplexer/demultiplexer for multiplexing a plurality of downstream data service signals outputted from the first wavelength division multiplexers, and for demultiplexing upstream data service signals to be transmitted to the first wavelength division multiplexers; and a second wavelength division multiplexer for multiplexing the multiplexed signals inputted from said second multiplexer/demultiplexer and the multiplexed signals inputted from the first WDM optical source, for demultiplexing upstream data service signals inputted from the local office and for outputting the demultiplexed signals to said second multiplexer/demultiplexer.

In accordance with another aspect of the present invention, there is provided a passive optical network system including a central office, a local office, and a plurality of subscriber terminals, the local office being connected to the central office and the subscriber terminals through optical fibers and providing optical communication service to the subscriber terminals, the local office comprising: a multiplexer/demultiplexer for demultiplexing optical signals for downstream data service and optical signals for downstream broadcasting service multiplexed and transmitted from the central office 100, and for multiplexing upstream optical signals transmitted from the subscriber terminals.

In accordance with another aspect of the present invention, there is provided a passive optical network system including a central office, a local office, and a plurality of subscriber terminals connected to the central office through the local office by optical fibers and being provided optical communication service provided from the central office, a subscriber terminal of said plurality comprising: a wavelength division multiplexer for demultiplexing optical signals transmitted downstream from the local office and dividing optical signals for downstream data service and optical signals for downstream broadcasting service and outputting the divided optical signals, and for multiplexing optical signals for upstream transmission from said subscriber terminal to the local office; a downstream data receiver for receiving optical signals for downstream data service demultiplexed by the wavelength division multiplexer and converting the received optical signals to electric signals; a downstream broadcasting receiver for receiving optical signals for downstream broadcasting service demultiplexed by the wavelength division multiplexer and converting the received optical signals to electric signals; and an upstream optical source for generating optical signals for upstream transmission to the local office through the wavelength division multiplexer.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, a wavelength-division-multiplexed optical source and a passive optical network system employing the same according to preferred embodiments of the present invention will be described with reference to the accompanying drawings. In the following description of the present invention, detailed description of known functions and configurations incorporated herein will be omitted when its inclusion might obscure the subject matter of the present invention unnecessarily.

Figure 1:
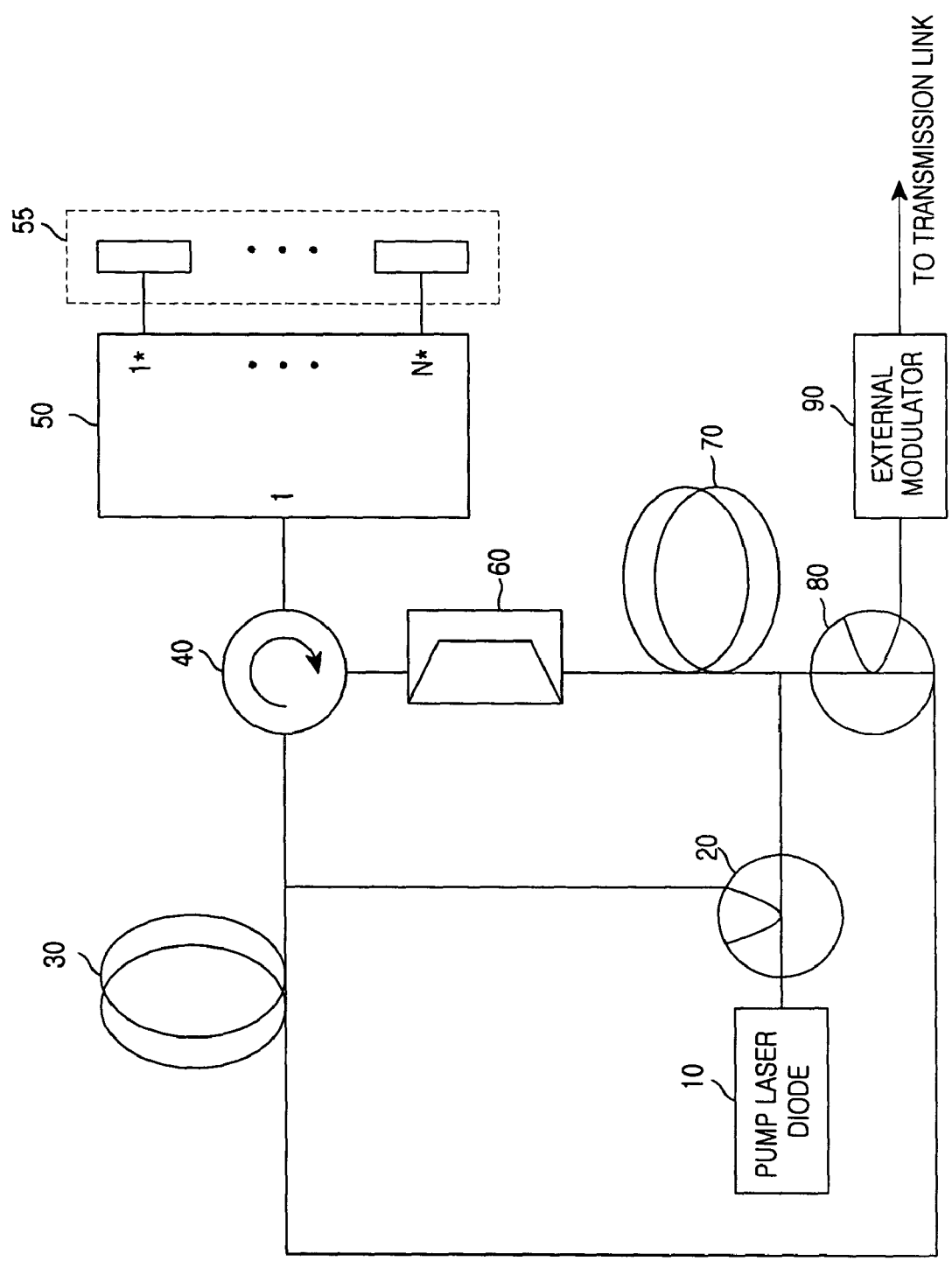
FIG. 1 is a schematic view of a wavelength-division-multiplexed (WDM) optical source in accordance with an embodiment of the present invention.

FIG. 1 is a schematic view of a wavelength-division-multiplexed (WDM) optical source in accordance with an embodiment of the present invention. Referring to FIG. 1, the WDM optical source according to an embodiment of the present invention comprises first and second optical amplifiers 30, 70, a circulator 40, a multiplexer/demultiplexer 50, a plurality of mirrors 55, a band-pass filter 60, first and a second optical splitters 20, 80, and an external modulator 90.

The first optical amplifier 30, preferably configured as an erbium-doped fiber amplifier (EDFA) or a semiconductor optical amplifier, is operated with rear pumping by a pump laser diode 10 and generates amplified spontaneous emission (ASE) noise. The first optical amplifier 30 amplifies multiplexed signals inputted from the second optical splitter 80 and outputs the amplified signals to the circulator 40.

The circulator 40 transmits signals inputted from the first optical amplifier 30 to an input/output terminal 1-N located on a second side of the multiplexer/demultiplexer 50, and outputs multiplexed signals inputted from the input/output terminals 1-N of the multiplexer/demultiplexer 50 to the band-pass filter 60.

The multiplexer/demultiplexer 50 has one input/output terminal at a first side and a plurality of input/output terminals 1-N at the second side. The multiplexer/demultiplexer 50 accordingly demultiplexes signals inputted from the input/output terminal of the first side to output the demultiplexed signals to the input/output terminals 1-N of the second side, and then multiplexes signals inputted from the input/output terminals 1-N of the second side to output the multiplexed signals to the input/output terminal of the first side. It is preferred that the multiplexer/demultiplexer 50 be configured with a 1×N waveguide grating router (WGR).

A plurality of mirrors 55 are connected in one-to-one correspondence to the plurality of input/output terminals 1-N located at the second side of the multiplexer/demultiplexer 50 and are disposed such that the mirrors 55 input again, i.e., reflect back, each demultiplexed signal outputted from the input/output terminals 1-N of the second side as input into the input/output terminals 1-N of the second side.

The band-pass filter 60 outputs the multiplexed signals inputted from the circulator 40 to the second optical amplifier 70, while limiting the multiplexed signal to a preset wavelength band-pass for the WDM optical source.

The second optical amplifier 70 is operated with rear pumping by a pump laser diode 10, and amplifies multiplexed signals which are outputted from the circulator 40 and then transmitted through the band-pass filter 60. It is preferred that the second optical amplifier 70 be configured as an erbium-doped fiber amplifier (EDFA) or a semiconductor optical amplifier.

It is also preferred that each of the first and the second optical splitters 20, 80 be configured with 1×N splitter. The first optical splitter 20 splits signals of the pump laser diode 10 to feed the first and the second optical amplifiers 30, 70. The second optical splitter 80 splits the multiplexed signals amplified by the second optical amplifier 70 for subsequent output to the first optical amplifier 30 and to outside the closed configuration.

The external modulator 90 modulates the multiplexed signals that are split and outputted outside from the second optical splitter 80, in accordance with preset broadcasting service signals, and then outputs the modulated signals to a transmission link. It is preferred that the external modulator 90 be configured with a LiNbO$_3$ modulator, an electro-absorption modulator or a semiconductor optical amplifier.

Figure 2:
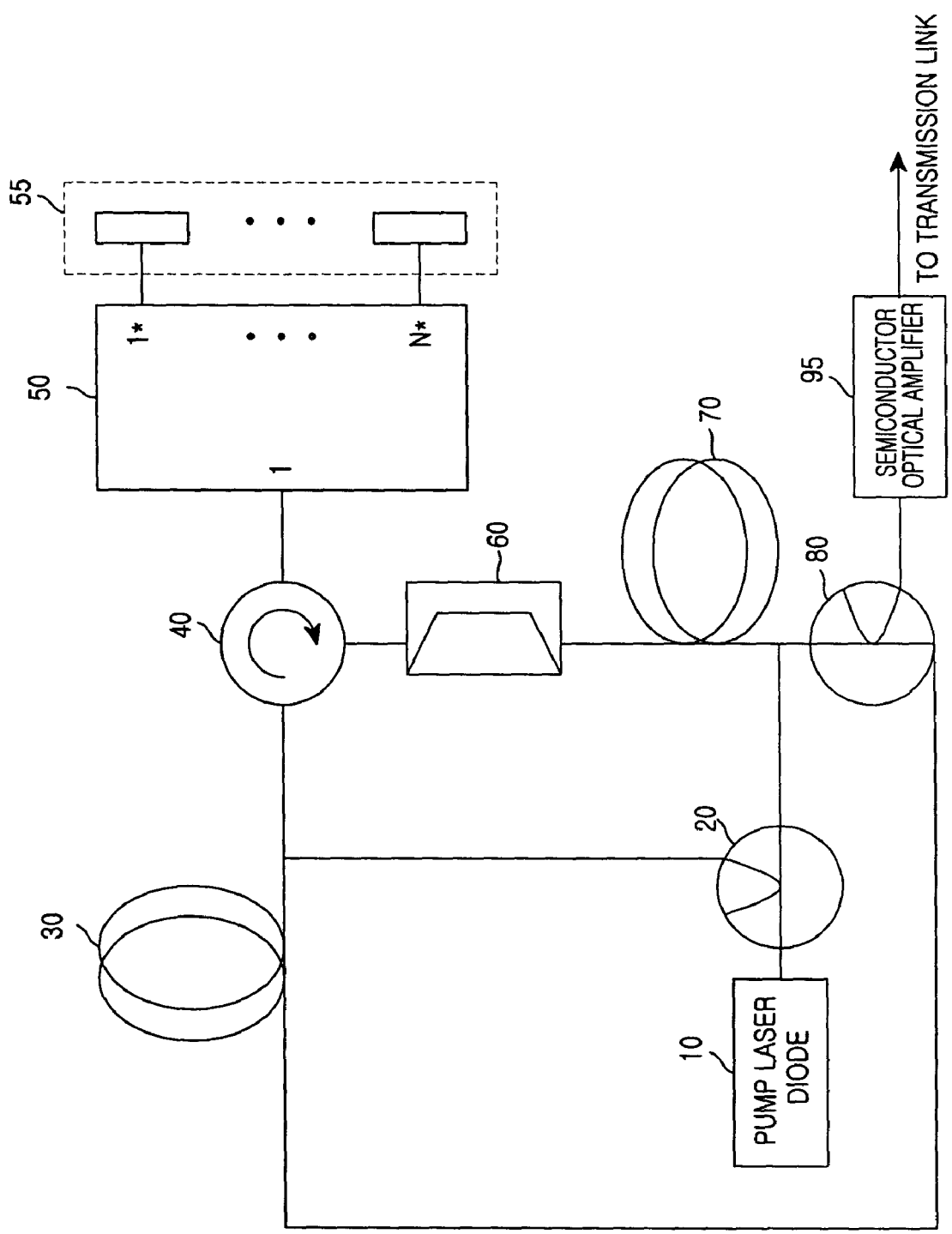
FIG. 2 is a schematic view of a WDM optical source in accordance with another embodiment of the present invention.

FIG. 2 portrays another embodiment that differs from the embodiment of FIG. 1 in that the external modulator is configured with a semiconductor optical amplifier 95. The semiconductor optical amplifier 95 can perform its modulation function at high speed due to its wide modulation bandwidth as well as perform optical amplification. The WDM optical source, modulating the WDM optical signals in accordance with broadcasting service signals and simultaneously amplifying the power, can therefore transmit more broadcasting service signals over longer distances.

With reference to FIGS. 1 and 2, ASE noise generated from the first optical amplifier 30 with a wide spectrum band enters the multiplexer/demultiplexer 50 configured with an 1×N waveguide grating router (WGR) by means of the circulator 40 and is spectrum-split by the multiplexer/demultiplexer into N channels. The spectrally split channels are reflected back by the N mirrors 55 connected to the second end of the multiplexer/demultiplexer 50 and are then multiplexed in the multiplexer/demultiplexer 50. The multiplexed signals are outputted to the circulator 40 and then transmitted by the circulator to the band-pass filter 60 which has the same band-pass as the free spectrum range (FSR) of the WGR for spectrum analysis. The filtered signals are amplified by the second optical amplifier 70 and are split by the second optical splitter 80 into signals destined for the first optical amplifier 30 and the external modulator 90, respectively. The filtered signals inputted to external modulator 90 are transmitted to a transmission link after being modulated in accordance with broadcasting service signals.

Filtered signals inputted to the first optical amplifier 30 by means of the second optical splitter 80 are amplified in the first optical amplifier 30, are inputted to the multiplexer/demultiplexer 50 by means of the circulator 40 to be demultiplexed, and are outputted after reflection as multiplexed signals. The multiplexed signals are amplified by the second optical amplifier 70 after being band pass filtered, and are inputted to the second optical splitter 80. The second optical splitter 80 splits the filtered signals for output to the first optical amplifier 30 and the external modulator 90/semiconductor optical amplifier 95, respectively, and the signals inputted to the external modulator 90/semiconductor optical amplifier 95 are modulated in accordance with broadcasting service signals.

The WDM optical source, as shown in FIGS. 1 and 2, repeats the serial operation endlessly, thus generating the multiplexed signals with very narrow line width and high power and inputting the multiplexed signals to the external modulator 90/semiconductor optical amplifier 95. By avoiding a chromatic dispersion effect as well as signal-to-signal beat noise, the optical source can transmit more broadcasting service signals over longer distances.

The increase in signal power is achieved, moreover, efficiently due to filtering by the band-pass filter 60.

Figure 3:
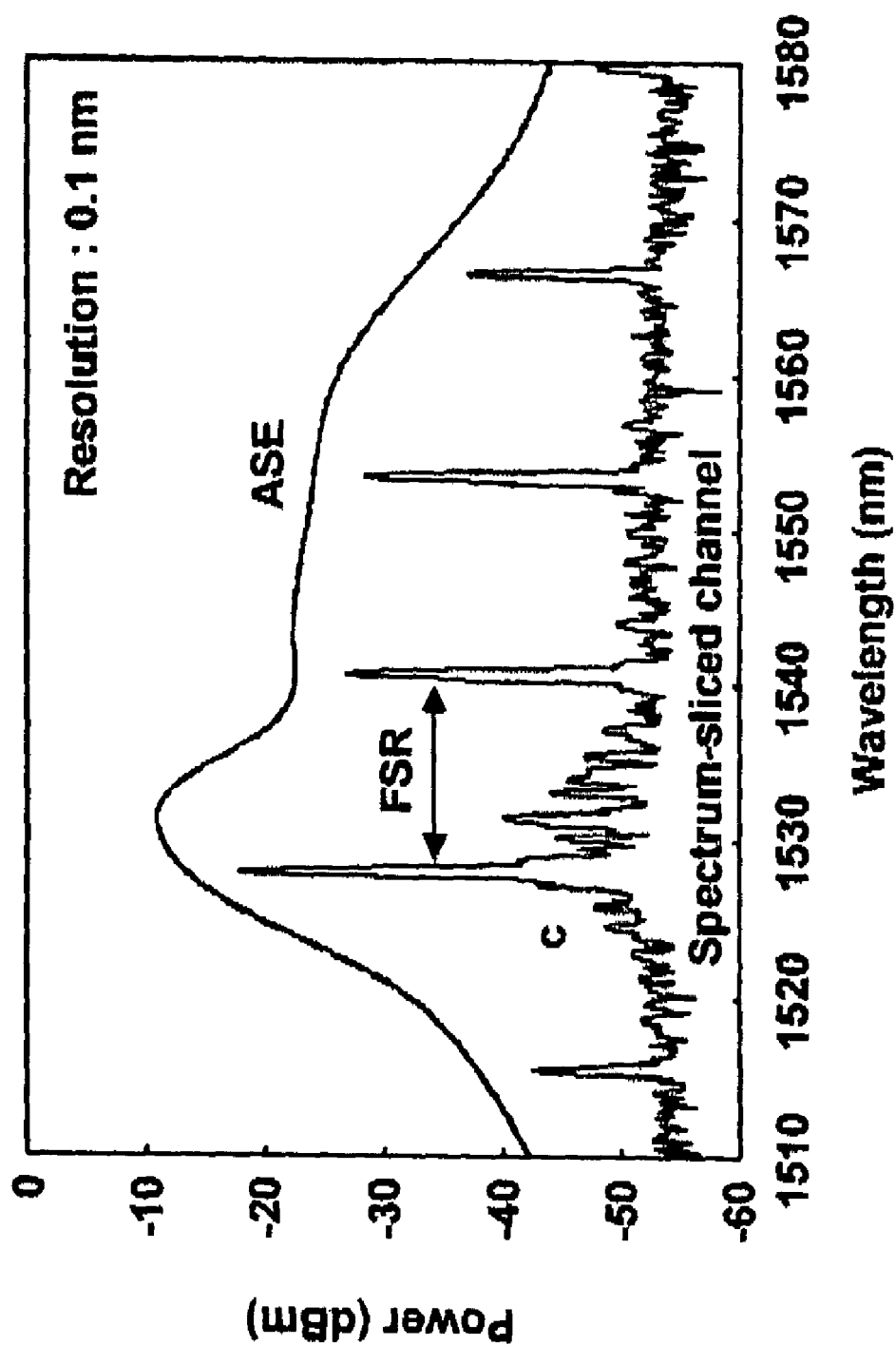
FIG. 3 is a waveform view illustrating a spectrum form of a spectrum-sliced channel.

If the bandwidth of the ASE noise signals outputted from the first optical amplifier 30 is wider than the free spectrum range (FSR) of the WGR configuring the multiplexer/demultiplexer 50, the signals inputted to the multiplexer/demultiplexer 50 are spectrum-split into a variety of wavelengths spread as the period of the FSR of the WGR, as shown in FIG. 3. Transmission performance may be degraded owing to the spectrum spread in the wide wavelength band and a consequent increase in chromatic dispersion effect and signal-to-signal beat noise, if such signals are inputted to the external modulator 90 and are transmitted after being modulated in accordance with broadcasting service signals.

It is therefore preferred that the band-pass filter 60 confine the spectrum band of the signals having been spectrum-split in the multiplexer/demultiplexer 50 to a band not exceeding a free spectrum range (FSR) of the WGR, so that the spectrum exists in only one wavelength. This allows the transmission of more broadcasting service signals and to a farther distance.

Figure 4:
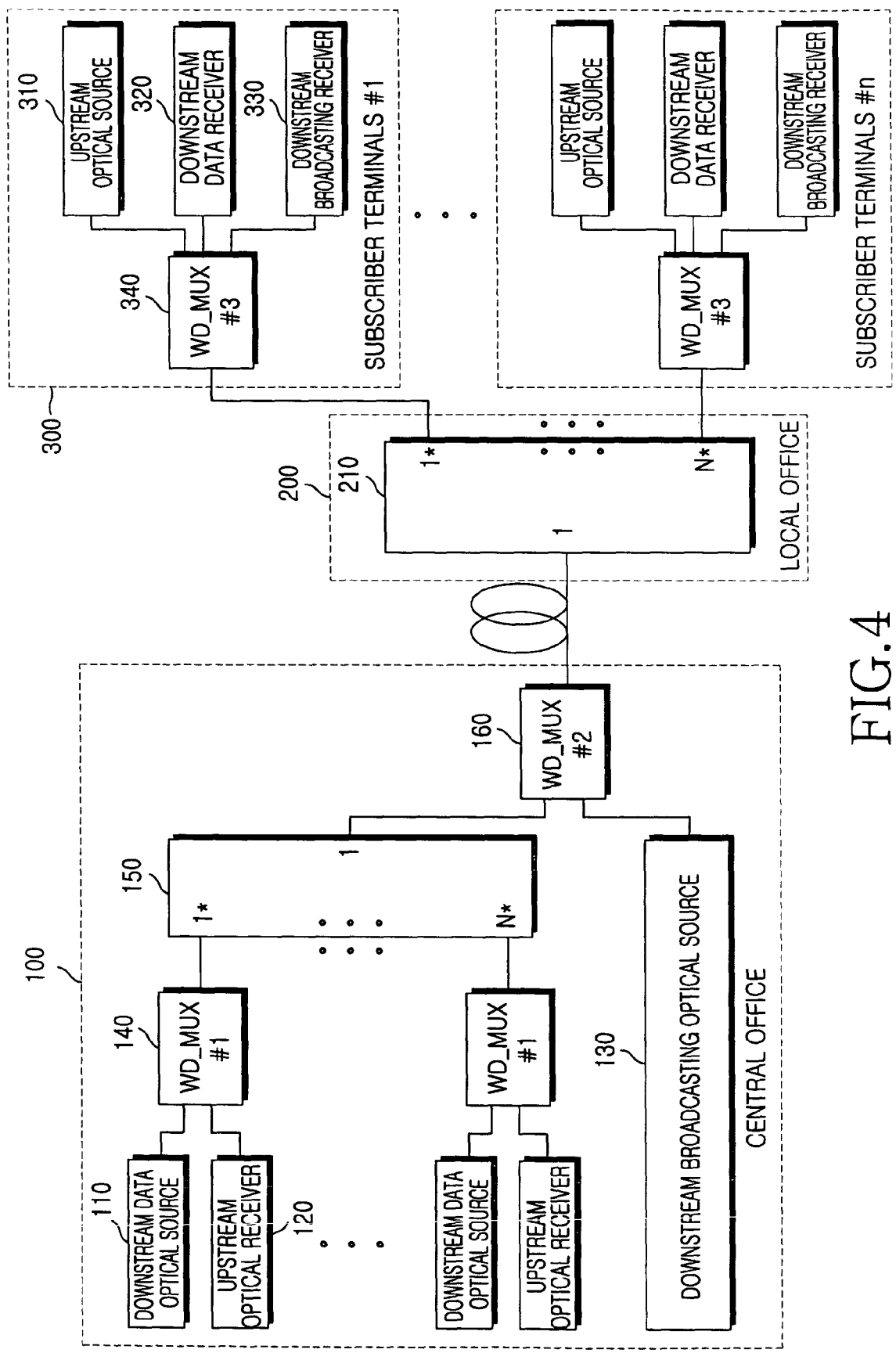
FIG. 4 is a schematic view of a passive optical network system in accordance with an embodiment of the present invention.

FIG. 4 is a schematic view of a passive optical network system in accordance with an embodiment of the present invention. The passive optical network system comprises a central office 100, a local office 200 and a plurality of subscriber terminals 300, each apparatus being connected with one another through an optical fiber. The central office 100 provides optical communication service to the subscriber terminals 300 through the local office 200. The local office 200 is connected to the central office 100 and the subscriber terminals 300 through an optical fiber so as to provide the subscriber terminals 300 optical communication service from the central office 100. The multiplexer/demultiplexer 150 in the central office 100 and the multiplexer/demultiplexer 210 in the local office 200 are identical with the multiplexer/demultiplexer 50 (referring to the FIG. 1).

The central office 100 includes two kinds of optical sources for simultaneously providing data service and broadcasting service downstream to the subscriber terminals 300. For example, the central office 100 may include a multi-channel downstream broadcasting optical source 130 and a plurality of downstream data optical sources 110. The central office 100 may also include a plurality of upstream optical receivers 120 for receiving the upstream data service signals transmitted from each subscriber terminal 300 to convert the received signals to electric signals. The configuration of the downstream broadcasting optical source 130 is that depicted and described in conjunction with FIG. 1 and therefore is not repeated here. The downstream broadcasting optical source 130 and the downstream data optical sources 110 preferably include band-pass filters having different band-pass from each other in order to generate optical signals that differ as to wavelength band. For example, if the downstream broadcasting optical source 130 comprises a first band-pass filter having a preset band-pass, it is preferred that each downstream data optical source 110 comprise a second band-pass filter having a band-pass different from the band-pass of the first band-pass filter. It is also preferred that the both band-pass filters be configured to have the same band-pass as a free spectrum range (FSR) of a multiplexer/demultiplexer 50 (referring to FIG. 1) included in the downstream broadcasting optical source 130, and to have its center wavelength separated by more than a FSR of a multiplexer/demultiplexer 50 (referring to FIG. 1) from the center wavelength of the second band-pass filter. Avoiding an overlap in the FSRs allows optical receivers in subscriber terminals to distinguish data service channels from broadcasting service channels.

The central office 100 includes a plurality of a first wavelength division multiplexers (WD_MUX#1) 140, multiplexer/demultiplexer 150, and a second wavelength division multiplexer (WD_MUX#2) 160.

Figure 7A:
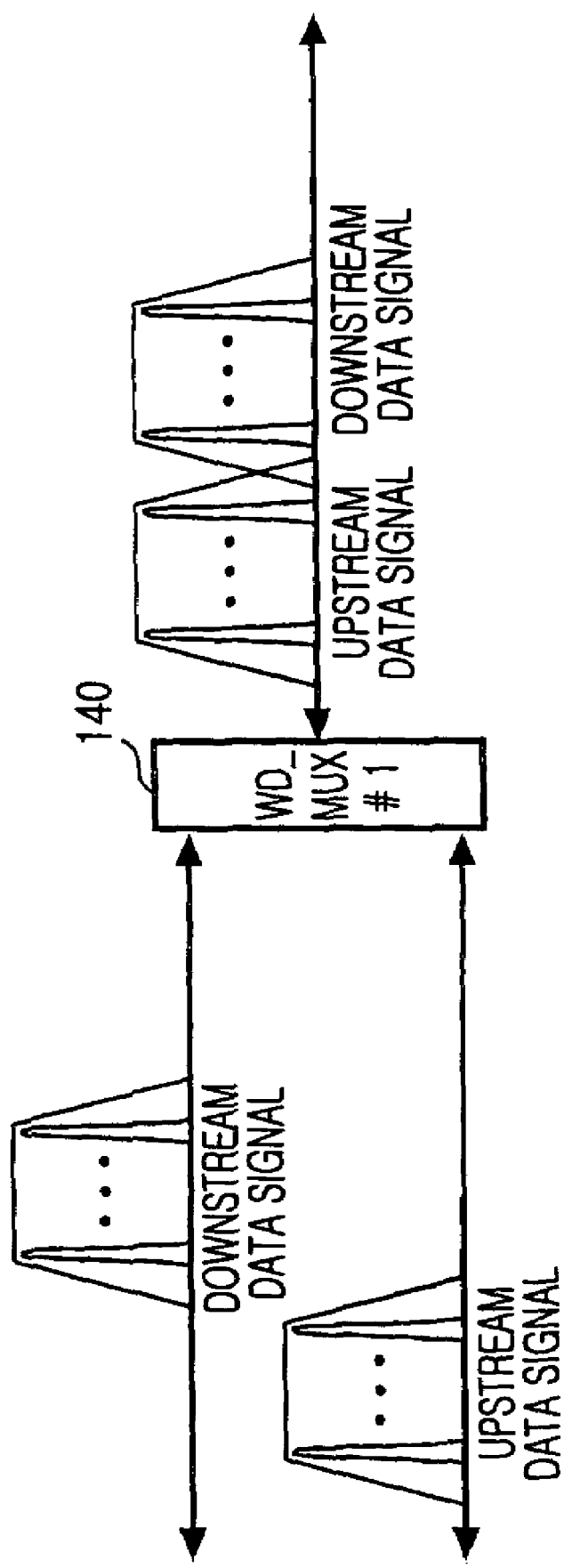
FIG. 7A describes band-pass characteristic of a first wavelength division multiplexer (MD_MUX#1) in a central office of a passive optical network system in accordance with an embodiment of the present invention.

The first wavelength division multiplexer (WD_MUX#1) 140 communicates upstream data service signals on its multiplexing side and downstream data service signals on its demultiplexing side. Accordingly, (WD_MUX#1) 140 possibly can be configured to include a third band-pass filter having the same band-pass as a preset wavelength band of the downstream data optical source 110 and a fourth band-pass filter having the same band-pass as a preset wavelength band of an upstream optical source 310 in the subscriber terminal 300. FIG. 7A describes band-pass characteristic of the first wavelength division multiplexer (MD_MUX#1) 140.

The multiplexer/demultiplexer 150 multiplexes a plurality of downstream data service signals outputted from the first wavelength division multiplexer (WD_MUX#1) 140 and demultiplexes upstream data service signals transmitted through the second wavelength division multiplexer (WD_MUX#2) 160. Multiplexer/demultiplexer 150 is preferably composed of 1×N waveguide grating router (WGR).

Figure 7B:
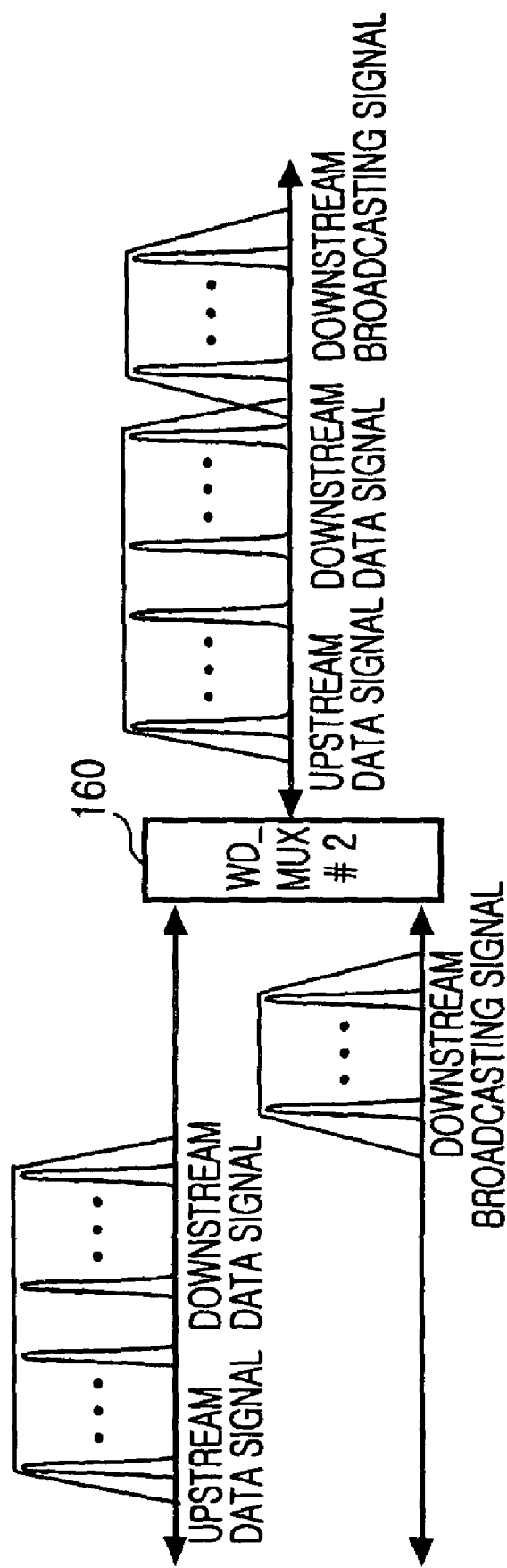
FIG. 7B describes band-pass characteristic of a second wavelength division multiplexer (MD_MUX#2) in a central office of a passive optical network system in accordance with an embodiment of the present invention.

The second wavelength division multiplexer (WD_MUX#2) 160 multiplexes the multiplexed signals inputted from the multiplexer/demultiplexer 150 and the multiplexed signals inputted from the downstream broadcasting optical source 130, and demultiplexes upstream data service signals inputted from the local office 200 to output the demultiplexed signals to the multiplexer/demultiplexer 150. That is, the second wavelength division multiplexer (WD_MUX#2) 160 has an operation characteristic which passes the wavelength-division-multiplexed optical signals for upstream/downstream data service and the signals of the downstream broadcasting optical source. It is therefore possible for the second wavelength division multiplexer (WD_MUX#2) 160 to include a fifth band-pass filter having the same band-pass as a wavelength band of wavelength-division-multiplexed optical signals for upstream/downstream data service by the operation characteristic and a sixth band-pass filter having the same band-pass as a preset wavelength band of the downstream optical source 130. FIG. 7B describes band-pass characteristic of the second wavelength division multiplexer (MD_MUX#2) 160.

The central office 100 preferably further comprises an optical amplifier (for example, an erbium-doped fiber amplifier) on an optical fiber connected to the local office 200 to amplify the downstream signals outputted from, and the upstream signals inputted to, the second wavelength division multiplexer (WD_MUX#2) 160.

The local office 200 comprises a multiplexer/demultiplexer 210 which demultiplexes multiplexed optical signals for downstream data service and multiplexed optical signals for downstream broadcasting service transmitted from the central office 100 and multiplexes upstream optical signals transmitted from the subscriber terminals 300. It is preferred that the multiplexer/demultiplexer 210 be implemented as a 1×N waveguide grating router (WGR).

The subscriber terminal 300 comprises a third wavelength division multiplexer (WD_MUX#3) 340, an upstream optical source 310, a downstream data receiver 320 and a downstream broadcasting receiver 330.

The third wavelength division multiplexer (WD_MUX#3) 340 demultiplexes optical signals transmitted downstream from the local office 200 and divides them for downstream data service and for downstream broadcasting service. The third wavelength division multiplexer (WD_MUX#3) 340 also multiplexes optical signals for upstream transmission from the subscriber terminal 300 to the local office 200 and outputs the multiplexed optical signals.

Figure 7C:
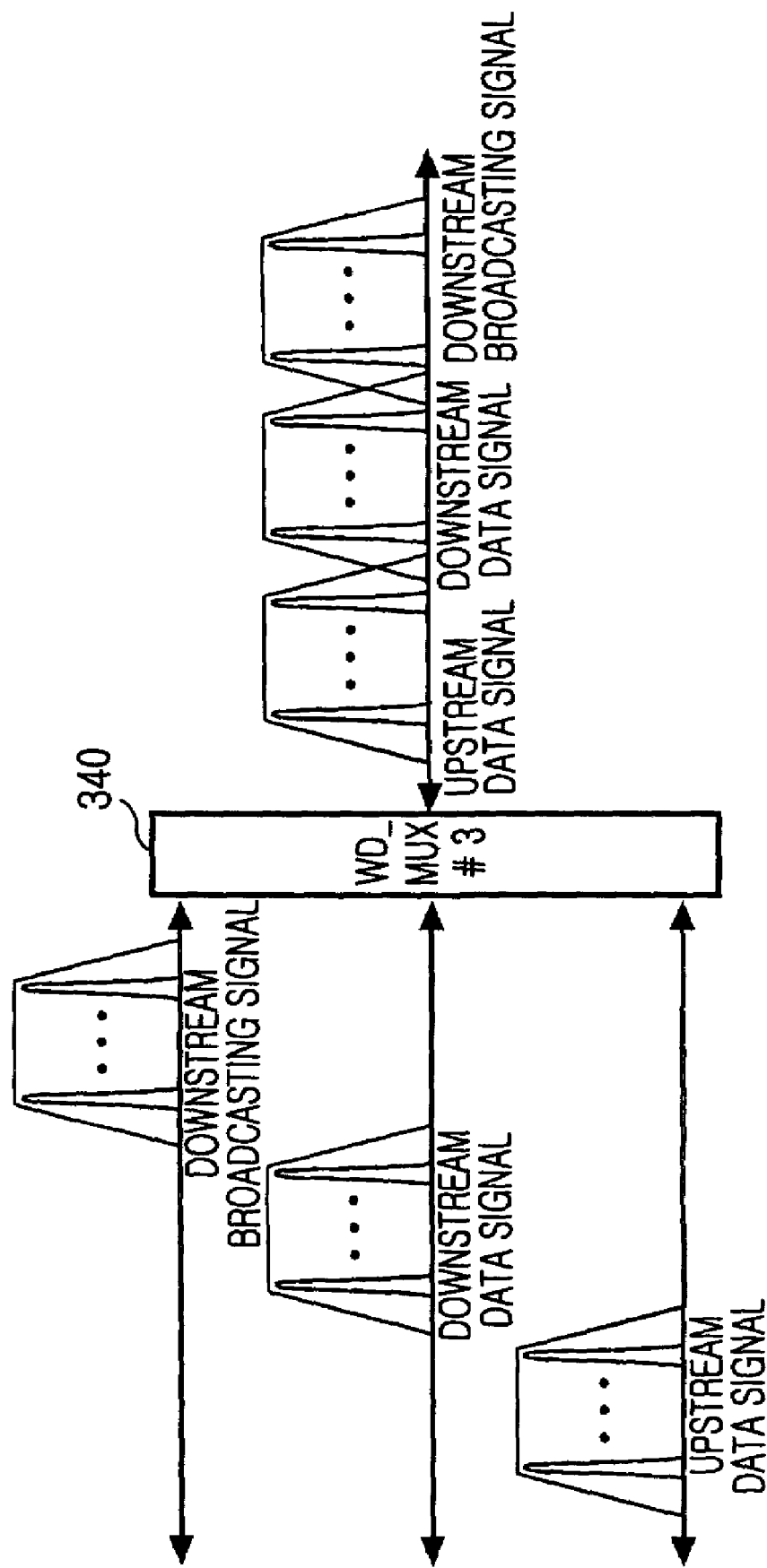
FIG. 7C describes band-pass characteristic of a third wavelength division multiplexer (MD_MUX#3) in a subscriber terminal of a passive optical network system in accordance with an embodiment of the present invention.

The third wavelength division multiplexer (WD_MUX#3) 340 can be configured with a seventh band-pass filter for passing the wavelength band of the upstream optical source 310, an eighth band-pass filter for passing optical signals for downstream data service, and a ninth band-pass filter for passing the optical signals for downstream broadcasting service, according to the operation characteristic. That is, because the third wavelength division multiplexer (WD_MUX#3) 340 has as an operation characteristic the function of passing the signals of the upstream optical source 310, the signals of the downstream data optical source 110, and the signals the downstream broadcasting optical source 130. FIG. 7C is a spectrum illustrating band-pass characteristic of the third wavelength division multiplexer (MD_MUX#3) 340.

The upstream optical source 310 generates optical signals for upstream transmission to the local office 200 through the third wavelength division multiplexer (WD_MUX#3) 340. The band-pass of the optical signals generated from the upstream optical source 310 is preferably confined to a different band-pass from that of the optical signals for downstream data service as well as a different band-pass from that of the optical signals for downstream broadcasting service. The downstream data receiver 320 receives optical signals for downstream data service demultiplexed by the third wavelength division multiplexer (WD_MUX#3) 340 and converts the received optical signals to electric signals.

The downstream broadcasting receiver 330 receives optical signals for downstream broadcasting service demultiplexed by the third wavelength division multiplexer (WD_MUX#3) 340 and converts the received optical signals to electric signals.

Operationally, optical signals generated from the downstream data optical source 110 and the downstream broadcasting optical source 130 in the central office 100, are multiplexed by the second wavelength division multiplexer (WD_MUX#2) 160 and are transmitted to the local office 200. Then, the multiplexer/demultiplexer 210 in the local office 200 demultiplexes the multiplexed signals, and divides the data service and broadcasting service optical signals for respective output to each pertinent channel. This is possible because the multiplexer/demultiplexer 210 is composed of 1×N waveguide grating router (WGR) the band-pass characteristic of which has a cyclic characteristic according to the free spectrum range (FSR).

Figure 5:
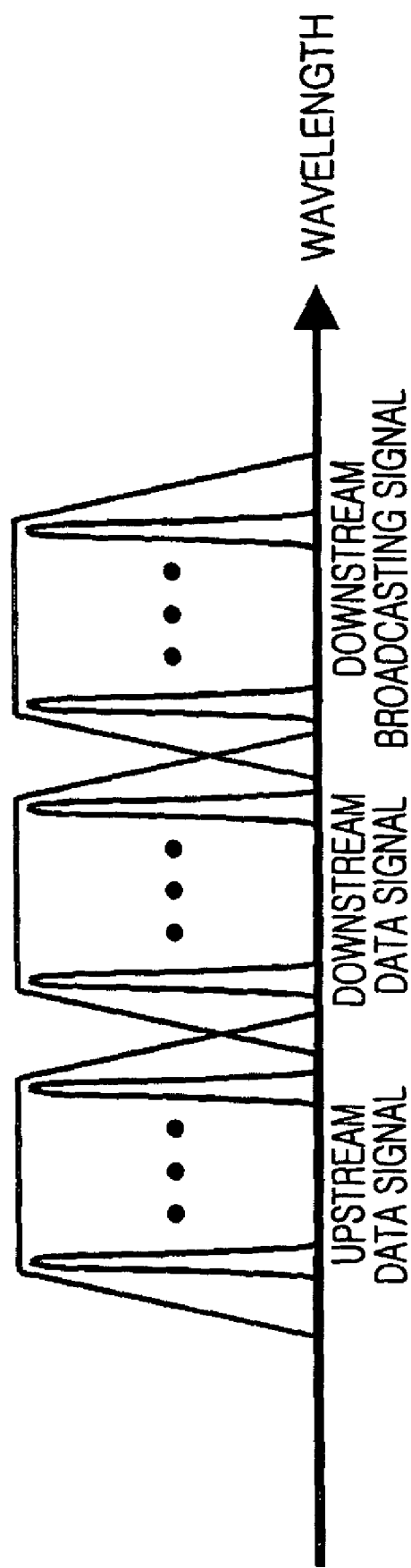
FIG. 5 illustrates a spectrum of signals multiplexed by a WDM in accordance with an embodiment of the present invention.

FIG. 5 is an exemplary conceptual diagram illustrating the spectra of multiplexed WDM optical signals for data service and for broadcasting service and a spectrum of multiplexed upstream optical signals, the spectra being mutually distinct by virtue of their respective disposition within the free spectrum range (FSR) of the WGR.

Figure 6A:
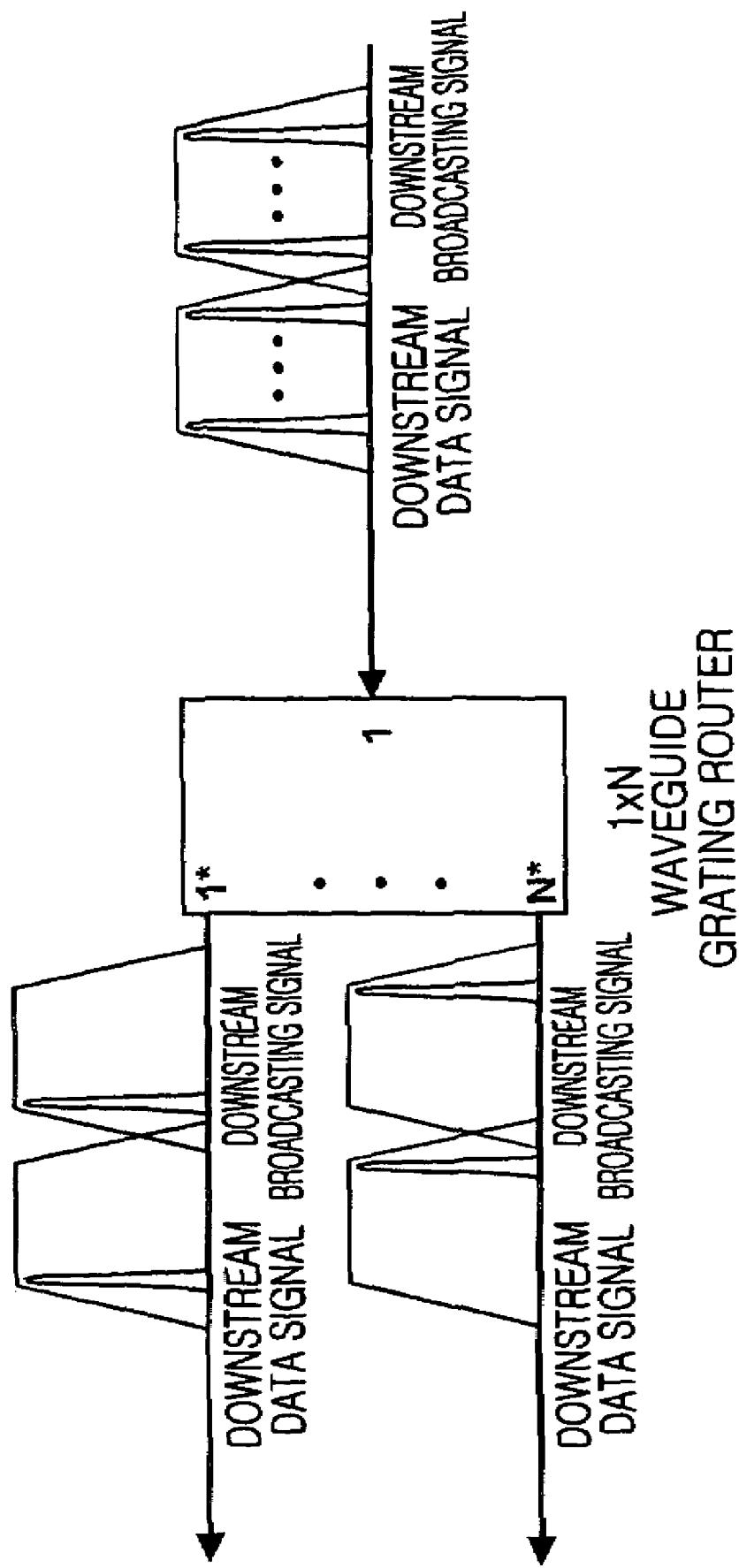
FIG. 6A illustrates a spectrum of downstream signals demultiplexed by a waveguide grating router in a local office of a passive optical network system in accordance with an embodiment of the present invention.
Figure 6B:
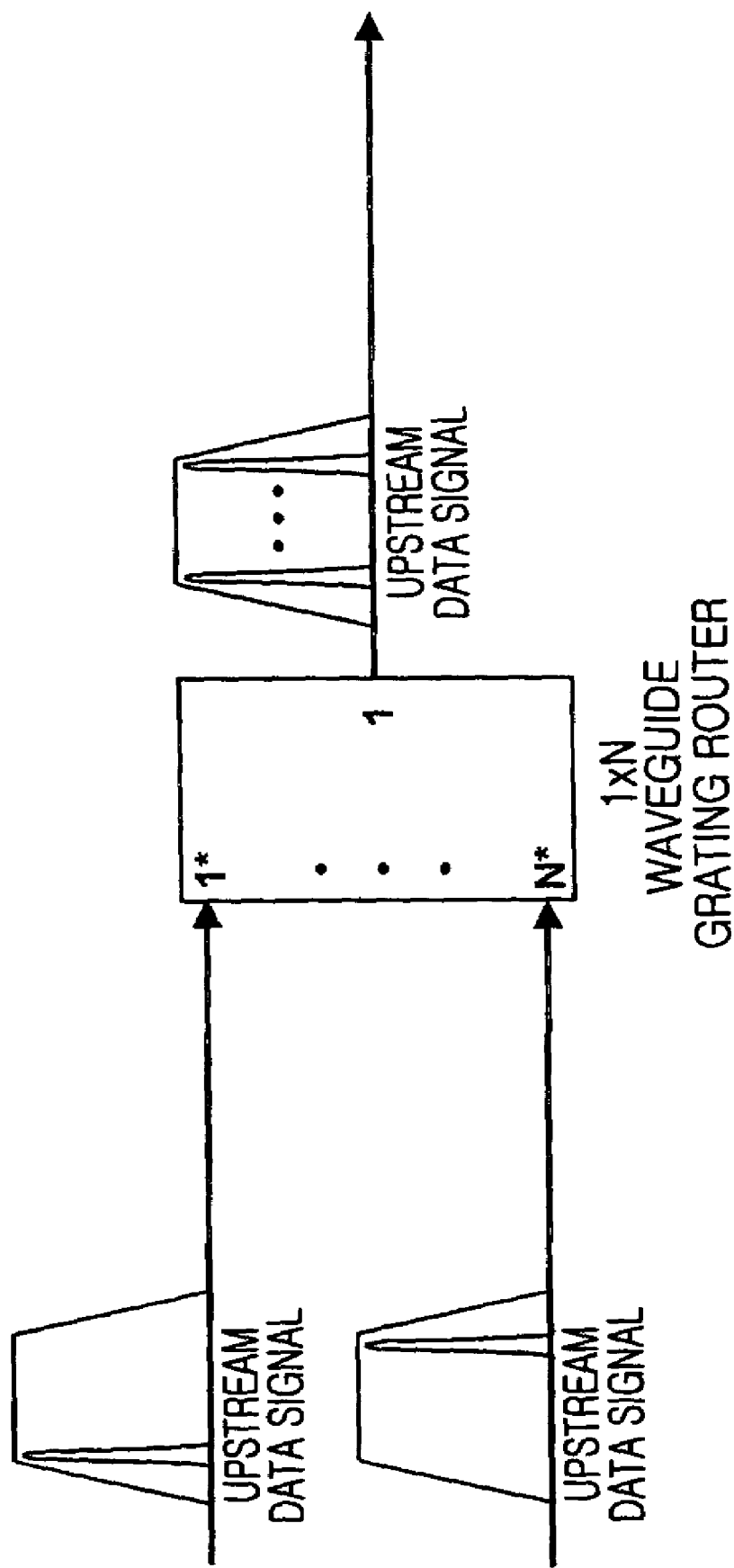
FIG. 6B illustrates a spectrum of upstream signals multiplexed by a waveguide grating router in a local office of a passive optical network system in accordance with an embodiment of the present invention.

FIG. 6A is an exemplary conceptual diagram illustrating a spectrum of channel signals for data service and for broadcasting service which are outputted to each subscriber terminal after being demultiplexed by the multiplexer/demultiplexer 210 in the local office 200. FIG. 6B is an exemplary conceptual diagram illustrating a spectrum of upstream signals outputted from the multiplexer/demultiplexer 210 in the local office 200.

Optical signals for data service and the optical signals for broadcasting service are demultiplexed by the multiplexer/demultiplexer 210 for output to respective third wavelength division multiplexers (WD_MUX#3) 340. The latter WDMs further demultiplex the received signals into optical signals that optical receivers 320, 330 convert into electrical signals.

Meanwhile, upstream optical signals which are outputted from the upstream optical source 310 are transmitted to the local office 200 through the third wavelength division multiplexer (WD_MUX#3) 340 and are then multiplexed by the multiplexer/demultiplexer 210. The latter multiplexed signals are transmitted to the central office 100, where they are demultiplexed in the multiplexer/demultiplexer 150 after passing through the second wavelength division multiplexer (WD_MUX#2) 160. The signals are then passed through the first wavelength division multiplexer (WD_MUX#1) 140 and are transmitted to the upstream optical receiver 120 to be convert to electric signals.

As described above, the WDM optical source according to the present invention adopts a spectrum-slicing method that advantageously relieves the need for a WDM optical source with a specific generation wavelength or a wavelength-stabilizing circuit for stabilizing wavelength. The WDM optical source according to the present invention also provides WDM signals with high power and very narrow line width, and therefore a broadcasting service without signal distortion by a chromatic dispersion effect. Nor is there a need for an additional amplifier and/or external modulator, which are expensive and whose implementation would economically burden subscribers.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wavelength-division-multiplexed optical source comprising:

a pump laser;

a first optical amplifier, operated by rear-pumping of the pump laser, for generating amplified spontaneous emission noise (ASE noise);

a first multiplexer/demultiplexer having a first input/output terminal on one side and a plurality of second input/output terminals on the other side, the first multiplexer/demultiplexer for demultiplexing signals inputted into the first input/output terminal and outputting the demultiplexed signals to the second input/output terminals, and the first multiplexer/demultiplexer for multiplexing signals inputted into the second input/output terminals and outputting the multiplexed signals to the first input/output terminal;

a plurality of mirrors, connected to the second input/output terminals in one-to-one correspondence, for inputting the demultiplexed signals outputted through the second input/output terminals back to the second input/output terminals;

a circulator for transmitting signals inputted from the first optical amplifier to the first input/output terminal, the circulator for outputting multiplexed signals inputted from the first input/output terminal;

a second optical amplifier, operated by rear-pumping of the pump laser, for amplifying multiplexed signals outputted from the circulator;

an optical splitter for splitting the multiplexed signals amplified by the second optical amplifier, the optical splitter for outputting the split signals to the first optical amplifier for external transmission, respectively; and an external modulator for modulating the signals outputted for external transmission according to preset broadcasting signals and for outputting the modulated signals to a transmission link.

2. A wavelength-division-multiplexed optical source as claimed in claim 1, wherein the optical source further comprises a band-pass filter for outputting the multiplexed signals inputted from the circulator to the second optical amplifier, after having limited the multiplexed signals to a preset wavelength band of the wavelength-division-multiplexed optical source.

3. A wavelength-division-multiplexed optical source as claimed in claim 1, wherein the first optical amplifier amplifies signals inputted from the optical splitter and outputs the amplified signals to the circulator.

4. A wavelength-division-multiplexed optical source as claimed in claim 1 or claim 3, wherein the first optical amplifier comprises an erbium-doped fiber amplifier.

5. A wavelength-division-multiplexed optical source as claimed in claim 1, wherein the first optical amplifier comprises a semiconductor optical amplifier.

6. A wavelength-division-multiplexed optical source as claimed in claim 1, wherein the muitiplexer/demultiplexer comprises a 1×N waveguide grating router (WGR).

7. A wavelength-division-multiplexed optical source as claimed in claim 1, wherein the second optical amplifier comprises an erbium-doped fiber amplifier.

8. A wavelength-division-multiplexed optical source as claimed in claim 1, wherein the second optical amplifier comprises a semiconductor optical amplifier.

9. A wavelength-division-multiplexed optical source as claimed in claim 1, wherein the external modulator comprises an LiNbO$_3$ modulator.

10. A wavelength-division-multiplexed optical source as claimed in claim 1, wherein the external modulator comprises an electro-absorption modulator.

11. A wavelength-division-multiplexed optical source as claimed in claim 1, wherein the external modulator comprises a semiconductor optical amplifier.

12. A passive optical network system including a central office, a local office, and a plurality of subscriber terminals, the central office being connected with a local office through an optical fiber and providing optical communication service to the subscriber terminals through the local office, the central office comprising:

a first wavelength-division-multiplexed (WDM) optical source configured to provide downstream broadcasting service signals to the subscriber terminals;

a plurality of second WDM optical sources configured to provide downstream data service signals to the subscriber terminals;

a plurality of optical receivers configured to receive upstream data service signals transmitted from the subscriber terminals and to convert the received signals to electric signals;

a plurality of first wavelength division multiplexers, a first wavelength division multiplexer of the plurality of first wavelength division multiplexers being configured to multiplex/demultiplex upstream/downstream data service signals and configured to provide upstream/downstream data services to the subscriber terminals;

a first multiplexer/demultiplexer configured to multiplex a plurality of downstream data service signals outputted from the first wavelength division multiplexers and configured to demultiplex upstream data service signals to be transmitted to the first wavelength division multiplexers; and a second wavelength division multiplexer configured to multiplex the multiplexed signals inputted from said first multiplexer/demultiplexer and the signals inputted from the first WDM optical source, the second wavelength division multiplexer being configured to demultiplex upstream data service signals inputted from the local office and to output the demultiplexed upstream data service signals to said first multiplexer/demultiplexer, wherein the second wavelength division multiplexer comprises an optical amplifier, the optical amplifier being configured to amplify downstream signals outputted from said first multiplexer/demultiplexer and being configured to amplify upstream signals inputted into the second wavelength division multiplexer, and wherein the optical amplifier is an erbium-doped fiber amplifier.

13. A passive optical network system as claimed in claim 12, wherein the first WDM optical source in the central office comprises:

a pump laser; a first optical amplifier, operated by rear-pumping of the pump laser, configured to generate amplified spontaneous emission (ASE) noise;

a second multiplexer/demultiplexer having a first input/output terminal on one side and a plurality of second input/output terminals on the other side, the second multiplexer/demultiplexer being configured to demultiplex signals inputted into the first input/output terminal and output the demultiplexed signals to the second input/output terminals, and the second multiplexer/demultiplexer being configured to multiplex signals inputted into the second input/output terminals and output the multiplexed signals to the first input/output terminal;

a plurality of mirrors, connected to the second input/output terminals in one-to-one correspondence, the mirrors being configured to input the demultiplexed signals output from the second input/output terminals back to the second input/output terminals;

a circulator configured to transmit signals input from the first optical amplifier to the first input/output terminal, the circulator being configured to output multiplexed signals inputted from the first input/output terminal;

a second optical amplifier, operated by rear-pumping of the pump laser, for amplifying multiplexed signals that are output from the circulator;

an optical splitter being configured to split the multiplexed signals amplified by the second optical amplifier, the optical splitter being configured to output the split signals to the first optical amplifier for external transmission, respectively; and an external modulator configured to modulate the signals for external transmission according to preset broadcasting signals and configured to output the modulated signals to a transmission link.

14. A passive optical network system as claimed in claim 13, wherein said first multiplexer/demultiplexer is a 1×N waveguide grating router (WGR).

15. A passive optical network system as claimed in claim 13, wherein the first WDM optical source in the central office further comprises a first band-pass filter configured to limit the multiplexed signal inputted from the circulator to a preset wavelength band-pass of the first WDM optical source.

16. A passive optical network system as claimed in claim 15, wherein the second WDM optical sources in the central office comprise second band-pass filters configured to limit a band-pass of the second WDM optical sources to one that differs from the band-pass of the first band-pass filter.

17. A passive optical network system as claimed in claim 16, wherein the second band-pass filters have the same band-pass as a free spectrum range (FSR) of said first multiplexer/demultiplexer, said second band-pass filters having a center wavelength separated from the center wavelength of the band-pass of the first bandpass filter by more than a FSR.

18. A passive optical network system as claimed in claim 12, wherein the first wavelength division multiplexer comprises:
a first band-pass filter having the same band-pass as a preset wavelength band of the second WDM optical sources; and
a second band-pass filter having the same band-pass as a wavelength band of an upstream optical source in the subscriber terminal.

19. A passive optical network system as claimed in claim 12, wherein the second wavelength division multiplexer comprises:
a first band-pass filter having the same band-pass as a wavelength band of WDM optical signals for upstream/downstream data services; and
a second band-pass filter having the same band-pass as a preset wavelength band of the first WDM optical source.

20. A passive optical network system as claimed in claim 12, wherein said first multiplexer/demultiplexer is a 1×N waveguide grating router (WGR).

21. A passive optical network system as claimed in claim 12, the local office comprising a local office multiplexer/demultiplexer configured to demultiplex downstream data service optical signals and downstream broadcasting service optical signals multiplexed and transmitted from the central office, and configured to multiplex upstream optical signals transmitted from the subscriber terminals.

22. A passive optical network system as claimed in claim 21, wherein the local office multiplexer/demultiplexer is a 1×N waveguide grating router (WGR).

* * * * *